US012308554B2

(12) United States Patent
Li et al.

(10) Patent No.: US 12,308,554 B2
(45) Date of Patent: May 20, 2025

(54) TERMINAL PROTECTOR, CONNECTOR AND CONNECTOR ASSEMBLY

(71) Applicants: Tyco Electronics (Suzhou) Ltd., Suzhou (CN); Tyco Electronics (Shanghai) Co., Ltd., Shanghai (CN)

(72) Inventors: Huaiheng Li, Suzhou (CN); Jun Zong, Shanghai (CN); Tao Dong, Suzhou (CN)

(73) Assignees: Tyco Electronics (Suzhou) Ltd., Suzhou (CN); Tyco Electronics (Shanghai) Co., Ltd., Shanghai (CN)

( * ) Notice: Subject to any disclaimer, the term of this patent is extended or adjusted under 35 U.S.C. 154(b) by 542 days.

(21) Appl. No.: 17/860,147

(22) Filed: Jul. 8, 2022

(65) Prior Publication Data

US 2023/0022905 A1 Jan. 26, 2023

(30) Foreign Application Priority Data

Jul. 21, 2021 (CN) ......................... 202121662845.9

(51) Int. Cl.

| | |
|---|---|
| ***H01R 13/00*** | (2006.01) |
| ***H01R 13/40*** | (2006.01) |
| ***H01R 13/502*** | (2006.01) |
| ***H01R 13/631*** | (2006.01) |
| ***H01R 13/74*** | (2006.01) |

(52) U.S. Cl.

CPC ........... *H01R 13/502* (2013.01); *H01R 13/40* (2013.01); *H01R 13/631* (2013.01); *H01R 13/745* (2013.01)

(58) Field of Classification Search

CPC ..... H01R 13/40; H01R 13/631; H01R 13/745

See application file for complete search history.

(56) References Cited

U.S. PATENT DOCUMENTS

| | | | | |
|---|---|---|---|---|
| 7,179,128 B2 * | 2/2007 | Iwata | H01H 85/0417 439/620.26 |
| 2004/0192113 A1 * | 9/2004 | Yamashita | H01R 13/6456 439/512 |
| 2010/0323556 A1 * | 12/2010 | Lee | H01R 13/743 439/567 |
| 2023/0022905 A1 * | 1/2023 | Li | H01R 13/5202 |

* cited by examiner

*Primary Examiner* — Phuong Chi Thi Nguyen

(74) *Attorney, Agent, or Firm* — Potomac Law Group, PLLC

(57) ABSTRACT

A terminal protector, a connector and a connector assembly are disclosed. the terminal protector has: a side wall; and a base plate connected to the bottom of the side wall and formed with a hole allowing the terminal to pass through. A first elastic cantilever is formed on the side wall of the terminal protector, the first elastic cantilever is a part of the side wall, and the inner and outer surfaces of the first elastic cantilever are respectively flush with the inner and outer surfaces of the side wall, so that the first elastic cantilever does not occupy the space outside the side wall. In the present invention, the elastic cantilever on the terminal protector does not occupy the space outside the side wall of the terminal protector. Therefore, it does not need to occupy the additional space inside the connector, and the effective utilization rate of the internal space of the connector is improved.

17 Claims, 13 Drawing Sheets

TERMINAL PROTECTOR, CONNECTOR AND CONNECTOR ASSEMBLY

CROSS-REFERENCE TO RELATED APPLICATION

This application claims the benefit of Chinese Patent Application No. 202121662845.9 filed on Jul. 21, 2021 in the State Intellectual Property Office of China, the whole disclosure of which is incorporated herein by reference.

BACKGROUND OF THE INVENTION

Field of the Invention

The present invention relates to a terminal protector, a connector including the terminal protector, and a connector assembly including the connector and a mating connector mated with the connector.

Description of the Related Art

In the prior art, if the terminal in the connector is long, the terminal is easy to be bent during mating the connector with a mating connector, which will cause damage to the terminal and connector. Therefore, it is necessary to provide a floating support that can move along the length direction of the terminal. A hole allowing the terminal to pass through is formed in the floating support. Before mating, the floating support is in an initial position and supports the end part of the terminal. In the mating process, the floating support gradually moves towards the root of the terminal under the push of the mating connector until it moves to its final position.

In the prior art, an arched elastic arm in the form of a simply supported beam is formed on the inner side of the side wall of the floating support, and both ends of the arched elastic arm are connected to the inner side of the side wall of the floating support. An engagement protrusion is formed on the top of the arched elastic arm, and an engagement recess suitable for engaging with the engagement protrusion on the arched elastic arm is formed on the housing of the mating connector. When the floating support is pushed to the final position by the mating connector, the engagement protrusion on the arched elastic arm engages with the engagement recess on the mating connector. Therefore, in the process of pulling out the mating connector, the floating support can be pulled from the final position to the initial position by the mating connector.

However, in the prior art, the arched elastic arm completely protrudes beyond the side wall of the floating support, which needs to occupy a large space inside the connector, reducing the effective utilization rate of the internal space of the connector, which will lead to the limitation of the size of the terminals and the spacing between the terminals in the connector. Sometimes, the size of the terminals and the spacing between the terminals must be reduced, which will seriously reduce the performance of the connector.

SUMMARY OF THE INVENTION

The present invention has been made to overcome or alleviate at least one aspect of the above mentioned disadvantages.

According to an aspect of the present invention, there is provided a terminal protector comprising: a side wall; and a base plate connected to the bottom of the side wall and formed with a hole allowing the terminal to pass through. A first elastic cantilever is formed on the side wall of the terminal protector, the first elastic cantilever is a part of the side wall, and the inner and outer surfaces of the first elastic cantilever are respectively flush with the inner and outer surfaces of the side wall, so that the first elastic cantilever does not occupy the space outside the side wall.

According to an exemplary embodiment of the present invention, a first blocking protrusion is formed on the outside of the first elastic cantilever, and the first blocking protrusion is adapted to cooperate with a blocking step on a connector to block the terminal protector at a predetermined position.

According to another exemplary embodiment of the present invention, an engagement protrusion is formed on the inner side of the first elastic cantilever, and the engagement protrusion is adapted to engage with an engagement recess on a mating connector to engage the terminal protector to the mating connector.

According to another exemplary embodiment of the present invention, an avoidance slot is formed on the terminal protector, and the avoidance slot is used to avoid a release protrusion on the connector, so as to allow the release protrusion to enter into or exit from the terminal protector through the avoidance slot.

According to another exemplary embodiment of the present invention, the terminal protector is in a box shape without a cover, and the first elastic cantilever is formed on each side wall of the terminal protector.

According to another aspect of the present invention, there is provided a connector which comprises a housing having an accommodation cavity surrounded by a side wall and a port suitable for inserting a mating connector. A second elastic cantilever is formed on the side wall of the housing, the second elastic cantilever is a part of the side wall of the housing, and the inner and outer surfaces of the second elastic cantilever are respectively flush with the inner and outer surfaces of the side wall of the housing, so that the second elastic cantilever does not occupy a space outside the side wall of the housing.

According to another exemplary embodiment of the present invention, the connector further comprises the above terminal protector which is installed in the accommodation cavity of the housing.

According to another exemplary embodiment of the present invention, the terminal protector is configured to be moved between an initial position and a final position relative to the housing along an extension direction of a terminal passing through the terminal protector; before mating with a mating connector, the terminal protector is pre held at the initial position close to the port of the housing; after mating with the mating connector, the terminal protector is pushed by the mating connector to the final position away from the port of the housing.

According to another exemplary embodiment of the present invention, when the terminal protector is pushed to the final position by the mating connector, the engagement protrusion on the terminal protector is engaged with the engagement recess on the mating connector, so as to allow the terminal protector to be pulled from the final position to the initial position by the mating connector.

According to another exemplary embodiment of the present invention, a blocking step is formed on the inner side of the side wall of the housing, the blocking step is adapted to cooperate with the first blocking protrusion on the terminal protector to prevent the terminal protector from being moved towards the port of the housing; a second blocking protrusion is formed on the inner side of the second elastic cantilever, and the second blocking protrusion is adapted to abut against the bottom surface of the terminal protector to prevent the terminal protector from being moved towards the bottom of the housing opposite to the port.

According to another exemplary embodiment of the present invention, when the terminal protector is in the initial position, the first blocking protrusion abuts against the blocking step, and the second blocking protrusion abuts against the bottom surface of the terminal protector, so that the terminal protector is held at the initial position.

According to another exemplary embodiment of the present invention, a release protrusion is formed on the inner side of the second elastic cantilever, and the release protrusion is adapted to drive the second blocking protrusion on the second elastic cantilever to separate from the terminal protector under the push of the inserted mating connector, so as to allow the terminal protector to be moved from the initial position to the final position.

According to another exemplary embodiment of the present invention, the release protrusion protrudes inward with a height exceeding the second blocking protrusion and has an arc-shaped guide surface or an inclined guide surface suitable for sliding contact with the mating connector; an avoidance slot for avoiding the release protrusion is formed on the terminal protector to allow the release protrusion to enter into or exit from the interior of the terminal protector through the avoidance slot.

According to another exemplary embodiment of the present invention, the housing is adapted to be installed in a mounting hole of a panel, and an elastic snap suitable for locking the panel is formed on the outside of the side wall of the housing.

According to another exemplary embodiment of the present invention, a lip plate is formed on the outside of the side wall of the housing, and the connector also includes a first elastic sealing ring installed on the lip plate; when the housing is installed into the mounting hole of the panel, the first elastic sealing ring is compressed between the panel and the lip plate to seal a mating interface between the housing and the panel.

According to another aspect of the present invention, there is provided a connector assembly comprising: the above connector; and a mating connector adapted to mate with the connector.

According to another exemplary embodiment of the present invention, the mating connector comprises: a mating housing; and a seat integrally formed with the mating housing or installed in the mating housing. The seat is adapted to be inserted into the housing of the connector, and an engagement recess adapted to engage with the engagement protrusion of the terminal protector is formed on the seat; the engagement protrusion and the engagement recess are configured to be able to separate from each other under the action of a predetermined pulling force, so that when the mating connector is pulled out, the terminal protector is able to be separated from the mating connector under the blocking of the blocking step.

According to another exemplary embodiment of the present invention, the mating housing comprises: an outer housing; and an inner housing arranged in the outer housing. The mating connector also comprises a second elastic sealing ring, which is sleeved on the inner housing; one end of the outer housing is connected to the inner housing, and the side wall at the port of the housing of the connector is inserted into a gap between the outer housing and the inner housing; the second elastic sealing ring is compressed between the side wall of the housing of the connector and the inner housing of the mating connector to seal a mating interface between the side wall of the housing of the connector and the inner housing of the mating connector.

In the above exemplary embodiments according to the present invention, the elastic cantilever on the terminal protector is a part of the side wall of the terminal protector and does not occupy the space outside the side wall of the terminal protector. Therefore, the elastic cantilever does not need to occupy an additional space inside the connector and improves the effective utilization of the internal space of the connector.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF PREFERRED EMBODIMENTS

Figure 1:
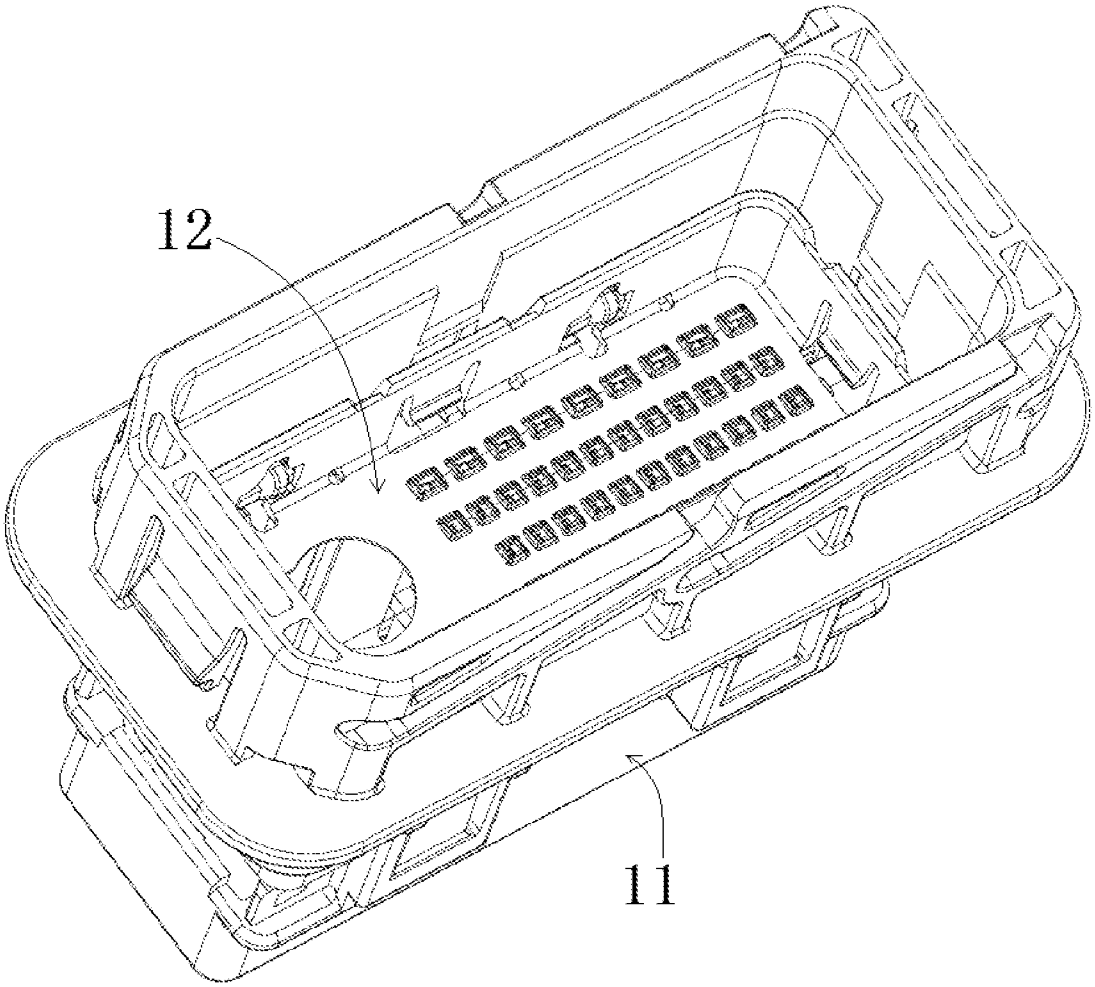
FIG. 1 shows an illustrative assembly diagram of a connector according to an exemplary embodiment of the present invention.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to a general technical concept of the present invention, a terminal protector is provided, which comprises: a side wall; and a bottom plate, which is connected to the bottom of the side wall and formed with a hole allowing the terminal to pass through. A first elastic cantilever is formed on the side wall of the terminal protector, the first elastic cantilever is a part of the side wall, and the inner and outer surfaces of the first elastic cantilever are respectively flush with the inner and outer surfaces of the side wall, so that the first elastic cantilever does not occupy the space outside the side wall.

According to another general technical concept of the present invention, there is provided a connector, including: a housing, which has an accommodation cavity surrounded by a side wall and a port suitable for inserting the mating connector. A second elastic cantilever is formed on the side wall of the housing, the second elastic cantilever is a part of the side wall of the housing, and the inner and outer surfaces of the second elastic cantilever are respectively flush with the inner and outer surfaces of the side wall of the housing, so that the second elastic cantilever does not occupy the space outside the side wall of the housing.

Figure 2:
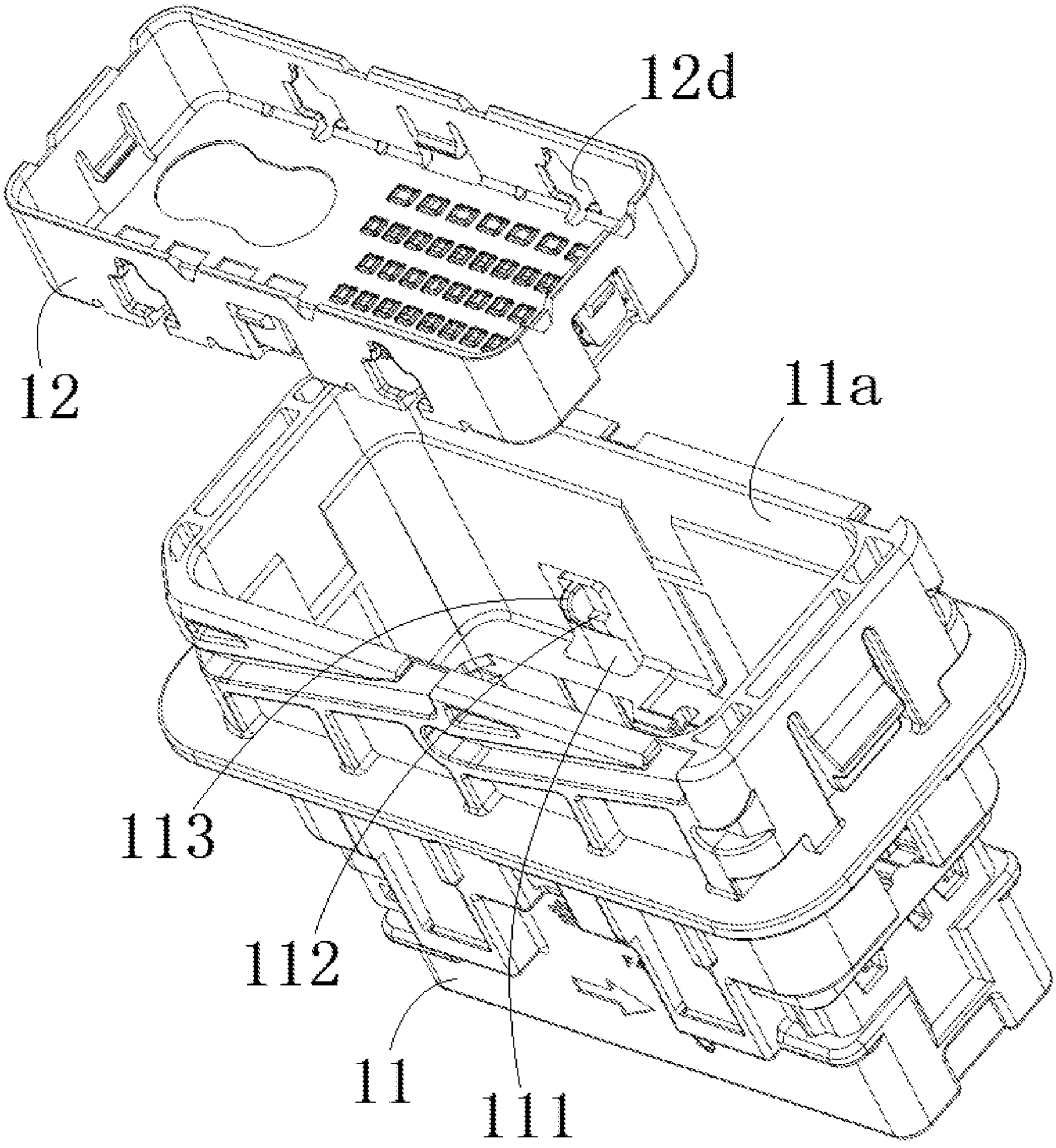
FIG. 2 shows the exploded schematic diagram of the connector shown in FIG. 1.
Figure 3:
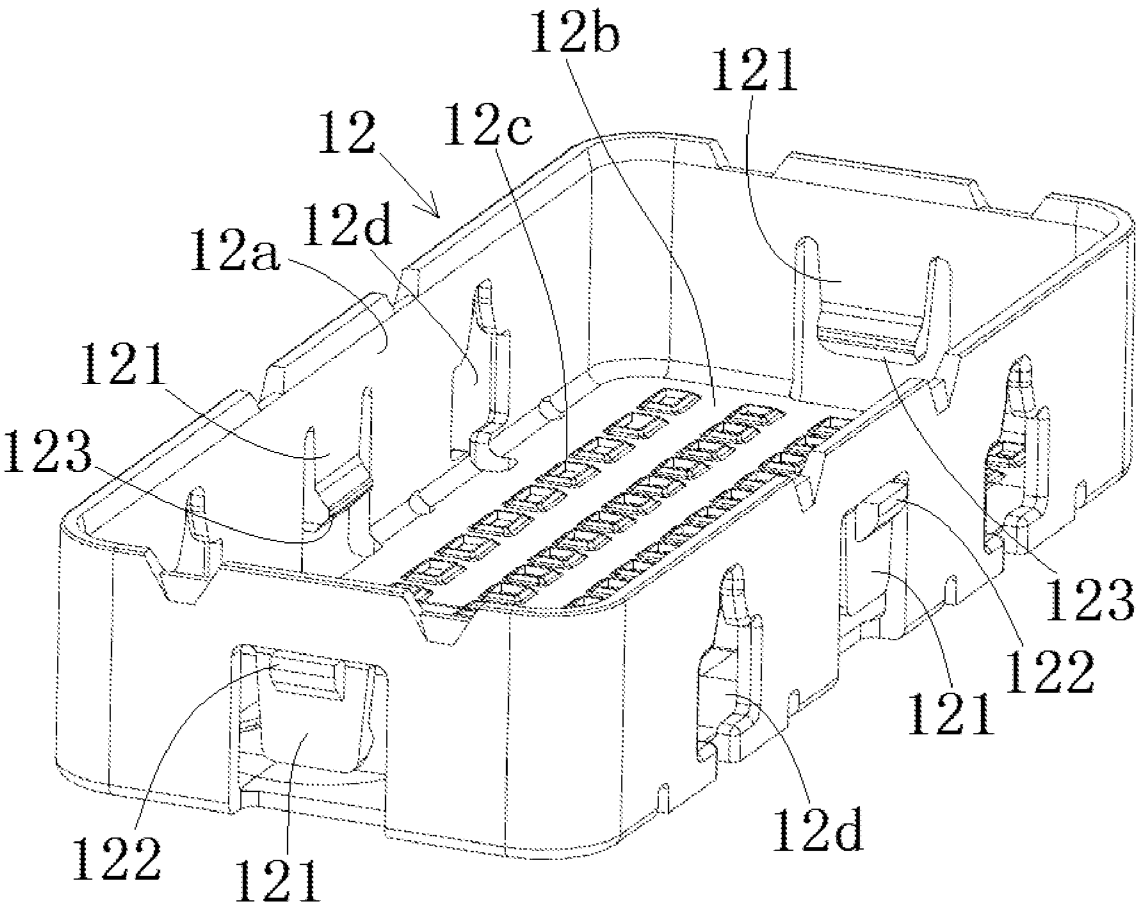
FIG. 3 shows an illustrative perspective view of the terminal protector of the connector shown in FIG. 2.
Figure 4:
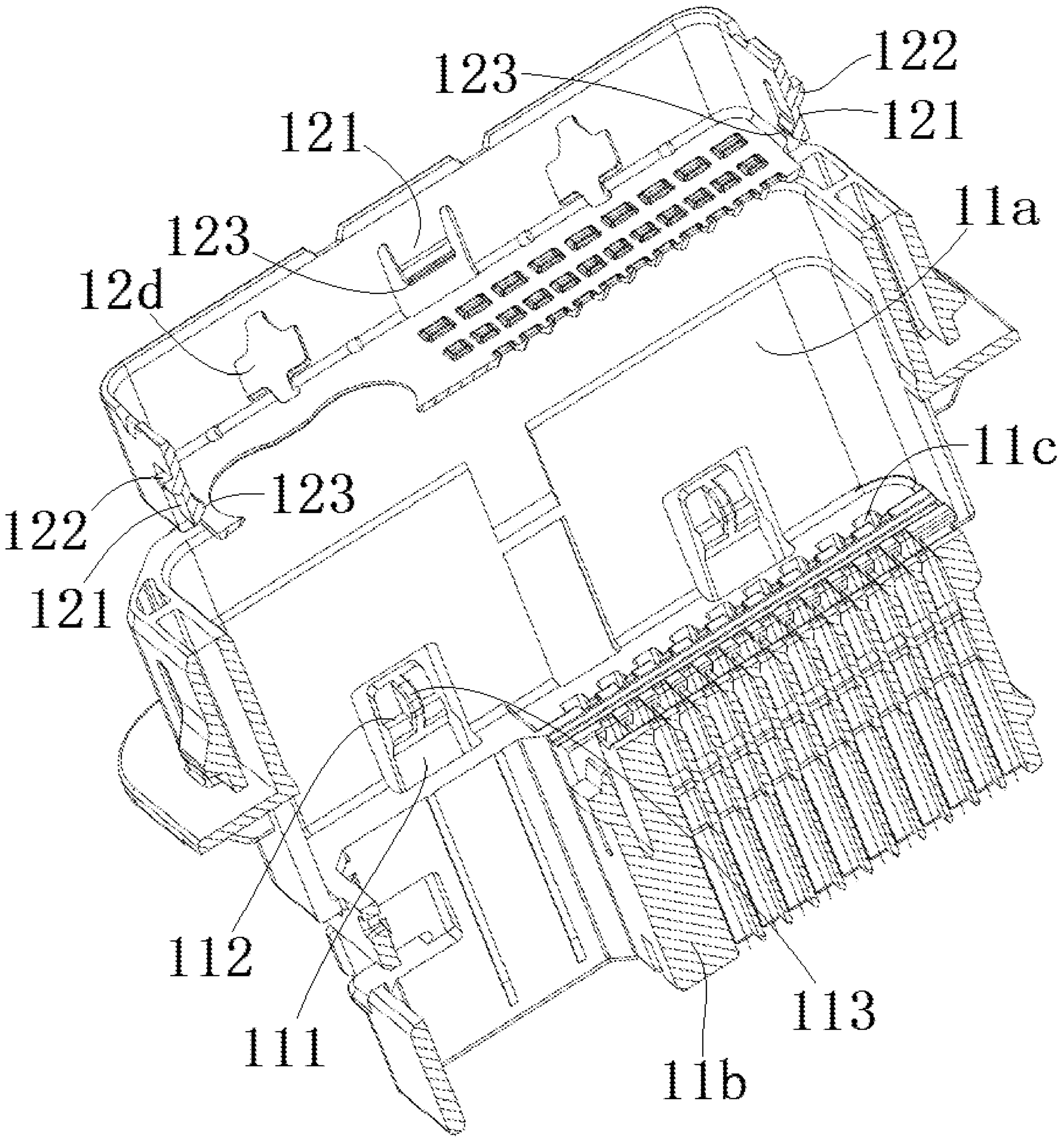
FIG. 4 shows a sectional view of the connector shown in FIG. 2.

FIG. 1 shows an illustrative assembly diagram of a connector according to an exemplary embodiment of the present invention; FIG. 2 shows the exploded schematic diagram of the connector shown in FIG. 1; FIG. 3 shows an illustrative perspective view of the terminal protector 12 of the connector shown in FIG. 2; FIG. 4 shows a sectional view of the connector shown in FIG. 2.

As shown in FIGS. 1 to 4, in the illustrated embodiment, the connector mainly includes a housing 11 and a terminal protector 12. The housing 11 includes a side wall 11*a* and a port suitable for inserting a mating connector (not shown). The terminal protector 12 is installed in an accommodation cavity of the housing 11. The side wall 11*a* of the housing 11 encloses the accommodation cavity, and the mating connector is suitable for inserting into the accommodation cavity through the port of the housing 11.

As shown in FIGS. 1 to 4, in the illustrated embodiment, the terminal protector 12 mainly includes a side wall 12*a* and a base plate 12*b*. The bottom plate 12*b* is connected to the bottom of the side wall 12*a* and formed with a hole 12*c* that allows a terminal (not shown) to pass through.

Figure 5:
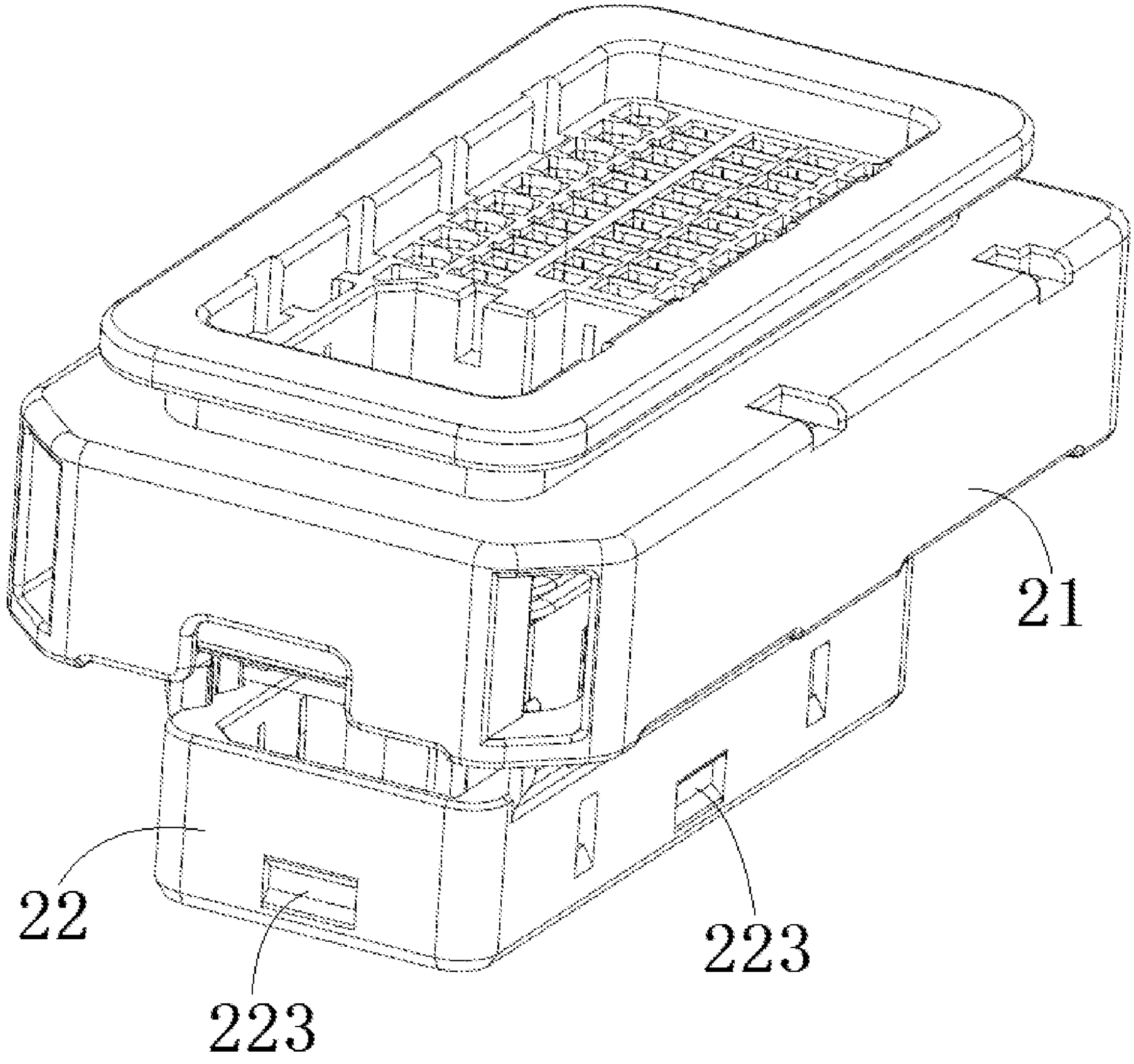
FIG. 5 shows an illustrative assembly diagram of a mating connector suitable for mating with the connector shown in FIG. 1 according to an exemplary embodiment of the present invention.
Figure 11:
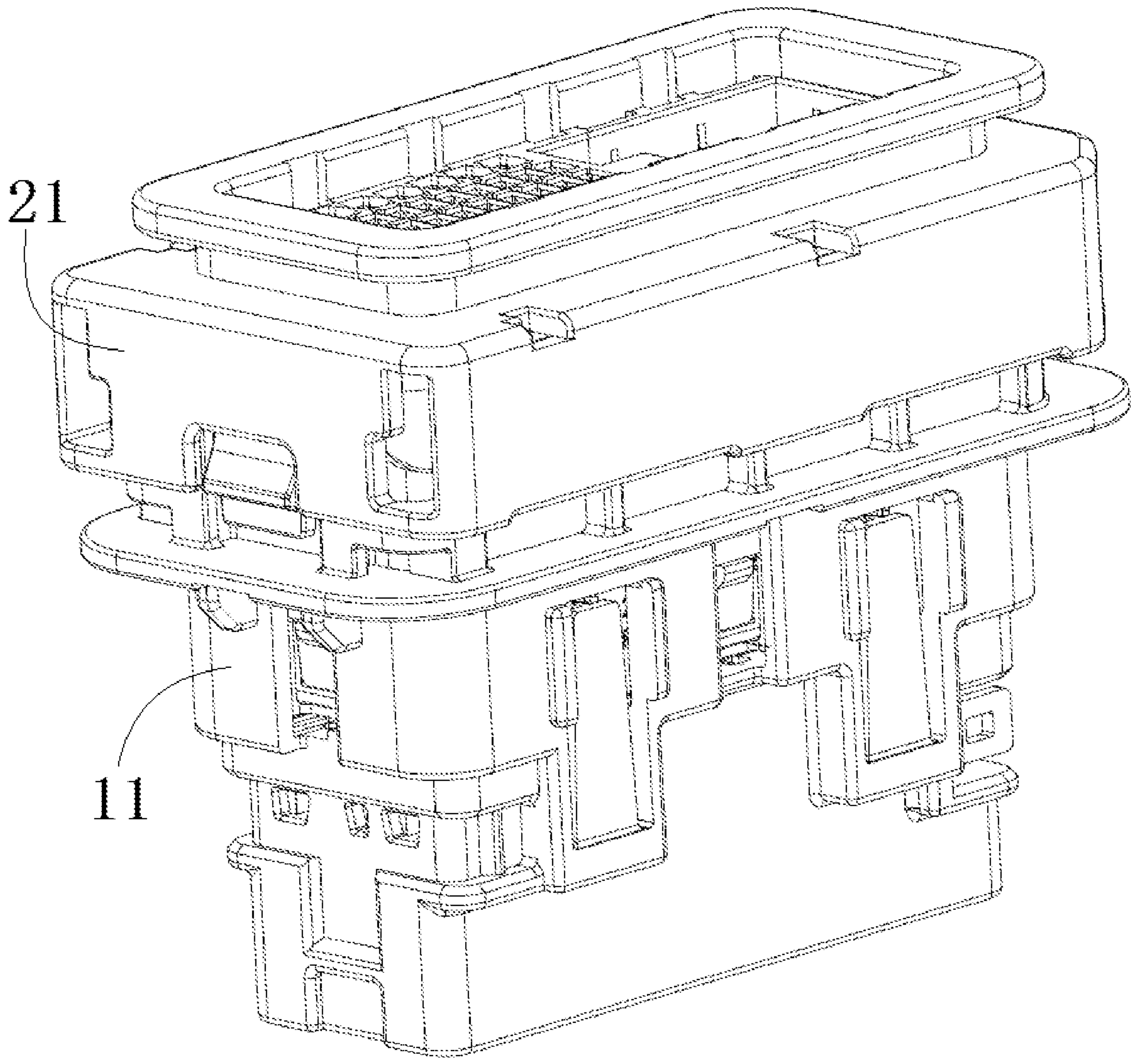
FIG. 11 shows the schematic diagram of the connector shown in FIG. 1 and the mating connector shown in FIG. 5, wherein the terminal protector is in the final position, and the connector and the mating connector are in the mating position.
Figure 12:
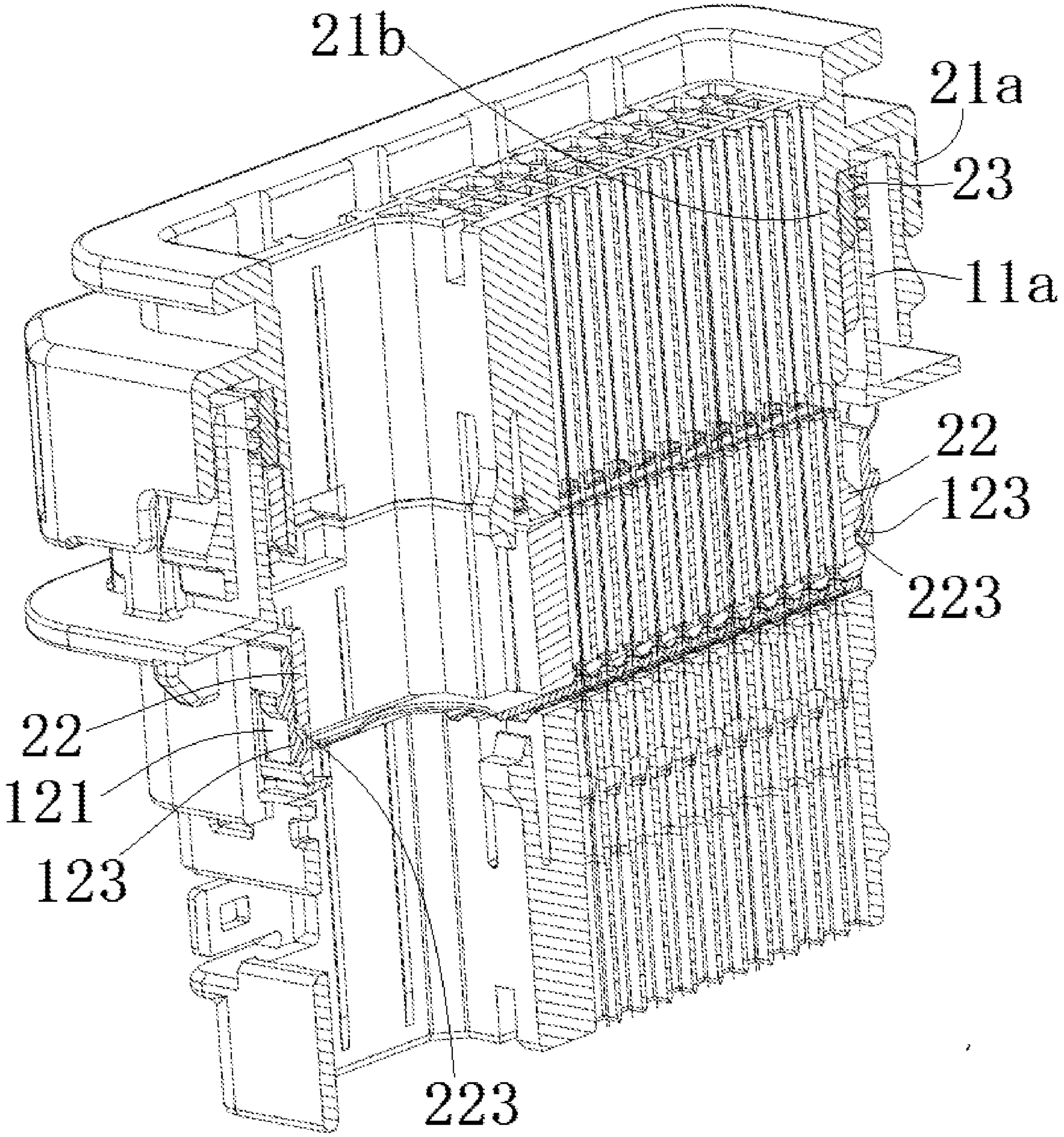
FIG. 12 shows a sectional view of the connector and mating connector shown in FIG. 11.

FIG. 5 shows an illustrative assembly diagram of a mating connector suitable for mating with the connector shown in FIG. 1 according to an exemplary embodiment of the present invention. FIG. 11 shows the schematic diagram of the connector shown in FIG. 1 and the mating connector shown in FIG. 5, wherein the terminal protector 12 is in the final position, and the connector and the mating connector are in the mating position; FIG. 12 shows a sectional view of the connector and mating connector shown in FIG. 11.

As shown in FIGS. 1-5 and FIGS. 11-12, in the illustrated embodiment, a first elastic cantilever 121 is formed on the side wall 12*a* of the terminal protector 12, and an engagement protrusion 123 suitable for engagement with the mating connector is formed on the inner side of the first elastic cantilever 121. The first elastic cantilever 121 of the terminal protector 12 is a part of the side wall 12*a* of the terminal protector 12, and the inner and outer surfaces of the first elastic cantilever 121 of the terminal protector 12 are respectively flush with the inner and outer surfaces of the side wall 12*a* of the terminal protector 12, so that the first elastic cantilever 121 of the terminal protector 12 does not occupy the space outside the side wall 12*a* of the terminal protector 12. In this way, the first elastic cantilever 121 does not need to occupy additional internal space of the connector, and can greatly improve the effective utilization rate of the internal space of the connector.

Figure 8:
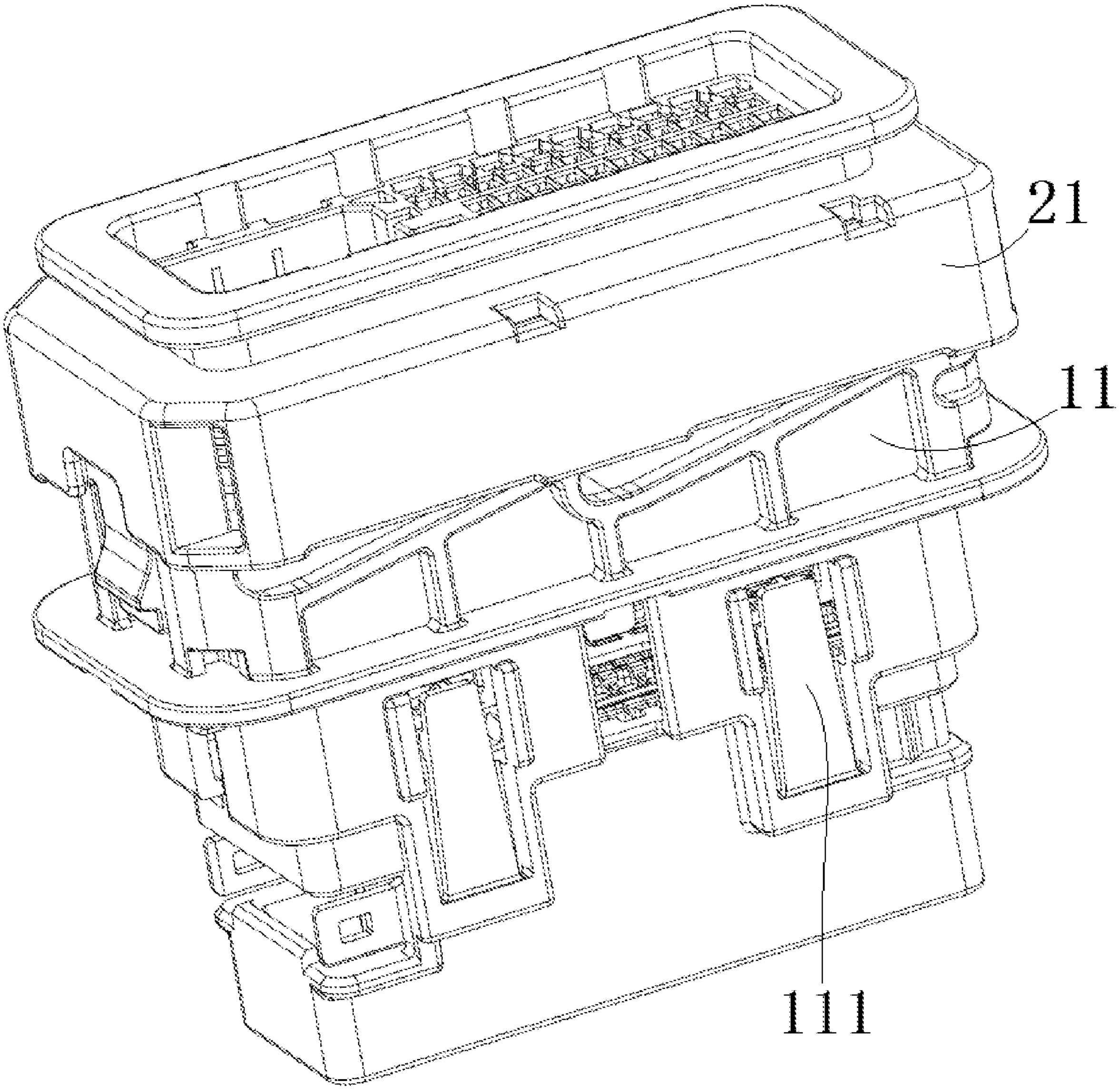
FIG. 8 shows the schematic diagram of the connector shown in FIG. 1 and the mating connector shown in FIG. 5, in which the terminal protector is in the initial position, and the connector and the mating connector are in the pre-mating position.
Figure 9:
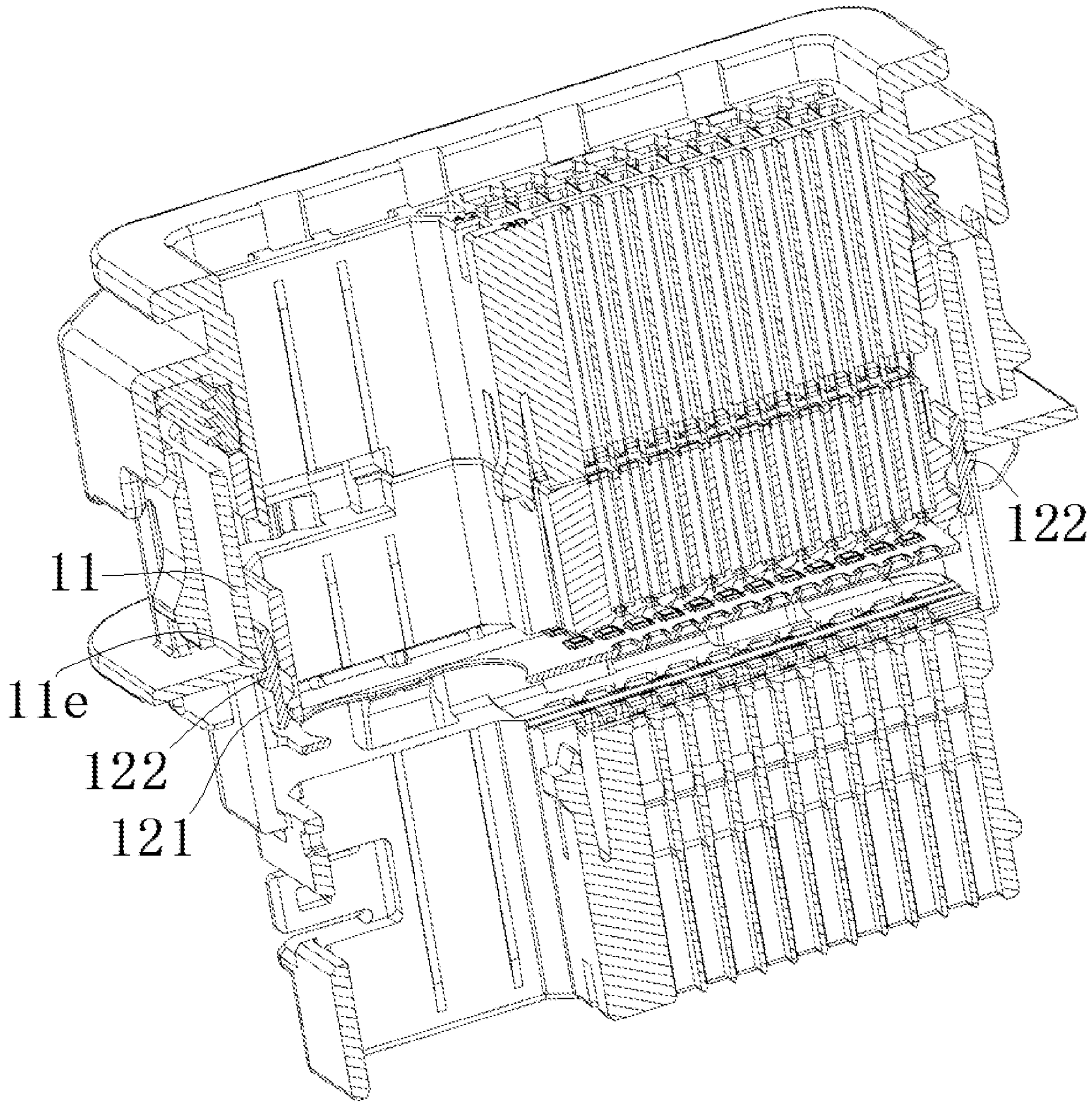
FIG. 9 shows a sectional view of the connector and mating connector shown in FIG. 8.
Figure 10:
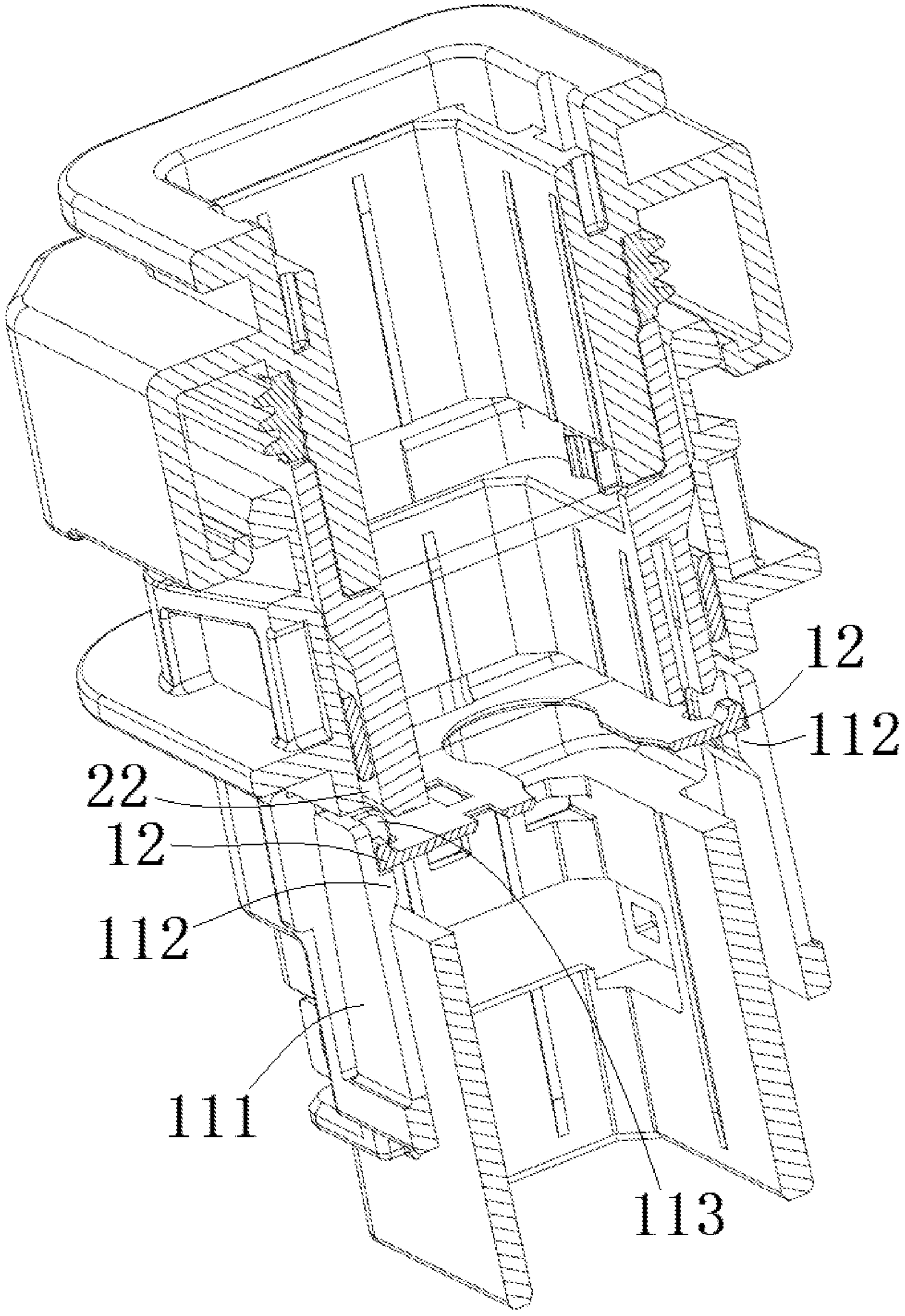
FIG. 10 shows another sectional view of the connector and mating connector shown in FIG. 8.

FIG. 8 shows the schematic diagram of the connector shown in FIG. 1 and the mating connector shown in FIG. 5, wherein the terminal protector 12 is in the initial position, and the connector and the mating connector are in the premating position; FIG. 9 shows a sectional view of the connector and mating connector shown in FIG. 8; FIG. 10 shows another sectional view of the connector and mating connector shown in FIG. 8.

As shown in FIGS. 1-5 and FIGS. 8-12, in the illustrated embodiment, the terminal protector 12 can move between the initial position (the position shown in FIG. 9 and FIG. 10) and the final position (the position shown in FIG. 12) along the extension direction of the terminal with respect to the housing 11.

As shown in FIGS. 8 to 10, in the illustrated embodiment, the terminal protector 12 is held at the initial position near the port of the housing 11 in advance before mating with the mating connector.

As shown in FIGS. 11 to 112, in the illustrated embodiment, after mating with the mating connector, the terminal protector 12 is pushed by the mating connector to the final position away from the port of the housing 11.

As shown in FIGS. 11 to 112, in the illustrated embodiment, when the terminal protector 12 is pushed to the final position by the mating connector, the engagement protrusion 123 on the terminal protector 12 is engaged with the mating connector, so that the terminal protector 12 can be pulled from the final position to the initial position by the mating connector.

As shown in FIGS. 1-5 and FIGS. 8-10, in the illustrated embodiment, a first blocking protrusion 122 is formed on the outside of the first elastic cantilever 121, and a blocking step 11*e* for mating with the first blocking protrusion 122 is formed on the inside of the side wall 11*a* of the housing 11 to prevent the terminal protector 12 from being moved towards the port of the housing 11. A second elastic cantilever 111 is formed on the side wall 11*a* of the housing 11, and a second blocking protrusion 112 is formed on the inner side of the second elastic cantilever 111. The second blocking protrusion 112 is adapted to abut against the bottom surface of the terminal protector 12 to prevent the terminal protector 12 from being moved towards the bottom of the housing 11 opposite to the port.

As shown in FIGS. 1-5 and FIGS. 8-10, in the illustrated embodiment, when the terminal protector 12 is in the initial position, the first blocking protrusion 122 abuts against the blocking step 11*e*, and the second blocking protrusion 112 abuts against the bottom surface of the terminal protector 12, thereby maintaining the terminal protector 12 in the initial position.

As shown in FIGS. 1-5 and 8-10, in the illustrated embodiment, the second elastic cantilever 111 on the housing 11 is a part of the side wall 11*a* of the housing 11, and the inner and outer surfaces of the second elastic cantilever

111 on the housing 11 are respectively flush with the inner and outer surfaces of the side wall 11*a* of the housing 11, so that the second elastic cantilever 111 on the housing 11 does not occupy the space outside the side wall 11*a* of the housing 11. In this way, the second elastic cantilever 111 does not need to occupy additional internal space of the connector, and can greatly improve the effective utilization rate of the internal space of the connector.

As shown in FIGS. 1-5 and FIGS. 8-12, in the illustrated embodiment, the first blocking protrusion 122 on the first elastic cantilever 121 is closer to the fixed end of the first elastic cantilever 121 than the engagement protrusion 123. That is, the engagement protrusion 123 on the first elastic cantilever 121 is closer to the free end of the first elastic cantilever 121 than the first blocking protrusion 122.

As shown in FIGS. 1-5 and FIGS. 8-12, in the illustrated embodiment, a release protrusion 113 is also formed on the inner side of the second elastic cantilever 111. The release protrusion 113 is suitable for driving the second blocking protrusion 112 on the second elastic cantilever 111 to separate from the terminal protector 12 under the push of the inserted mating connector, so as to allow the terminal protector 12 to be moved from the initial position to the final position.

As shown in FIGS. 1-5 and FIGS. 8-12, in the illustrated embodiment, the release protrusion 113 protrudes inward more than the second blocking protrusion 112 and has an arc-shaped guide surface or an inclined guide surface suitable for sliding contact with the mating connector. An avoidance slot 12*d* for avoiding the release protrusion 113 is formed on the terminal protector 12 to allow the release protrusion 113 to enter into or exit from the interior of the terminal protector 12 via the avoidance slot 12*d*.

As shown in FIGS. 1-5 and 8-12, in the illustrated embodiment, the terminal protector 12 is in a box shape without a cover, and a first elastic cantilever 121 is formed on each side wall 12*a* of the terminal protector 12. Two avoidance slots 12*d* are respectively formed on one pair of side walls 12*a* of the terminal protector 12, and the other pair of side walls 12*a* are not provided with any avoidance slot 12*d*. In the illustrated embodiment, on the side wall 12*a* provided with the avoidance slots 12*d*, the first elastic cantilever 121 is arranged between the two avoidance slots 12*d*.

Figure 13:
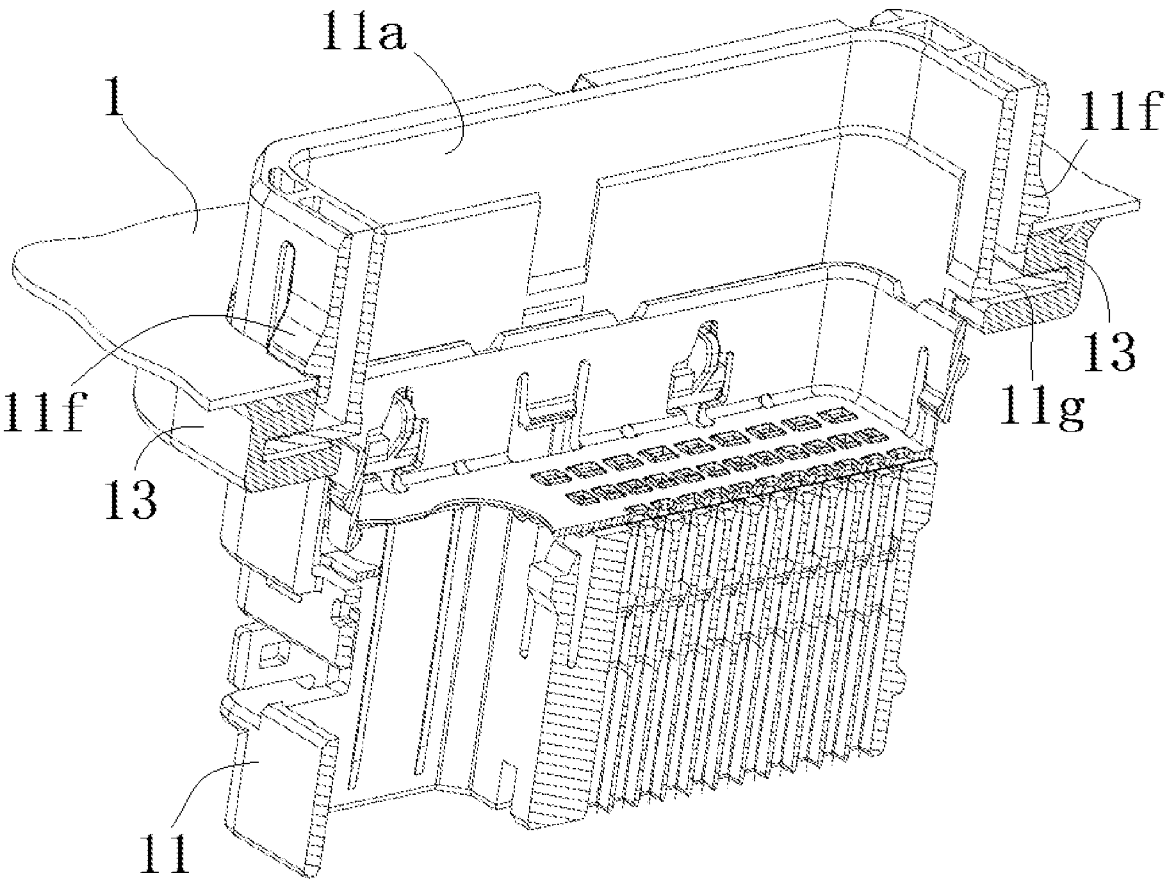
FIG. 13 shows the connector shown in FIG. 1 installed in a mounting hole of a panel.

FIG. 13 shows the schematic diagram of the connector shown in FIG. 1 installed in a mounting hole of a panel 1.

As shown in FIGS. 1-4 and FIG. 13, in the illustrated embodiment, the connector housing 11 is adapted to be installed into the mounting hole of the panel (E. G., the vehicle body panel) 1, and an elastic snap 11*f* suitable for locking on the panel 1 is formed on the outside of the side wall 11*a* of the housing 11.

As shown in FIGS. 1-4 and 13, in the illustrated embodiment, a lip plate 11*g* is also formed on the outside of the side wall 11*a* of the housing 11, and the connector also includes a first elastic sealing ring 13 mounted on the lip plate 11*g*.

As shown in FIG. 13, in the illustrated embodiment, when the housing 11 is installed in the mounting hole of the panel 1, the first elastic sealing ring 13 is compressed between the panel 1 and the lip plate 11*g* to seal the mating interface between the housing 11 and the panel 1.

As shown in FIGS. 1-4 and FIG. 13, in the illustrated embodiment, the housing 11 also includes a base 11*b* located inside it. The base 11*b* is formed with holes 11*c* corresponding to the holes 12*c* of the terminal protector 12. The terminal passes through the hole 11*c* of the base 11*b* and the hole 12*c* of the terminal protector 12 in turn.

As shown in FIGS. 1-4 and 11-12, in the illustrated embodiment, when the terminal protector 12 is pushed to the final position, the bottom surface of the terminal protector 12 abuts against the top surface of the base 11*b*.

Figure 6:
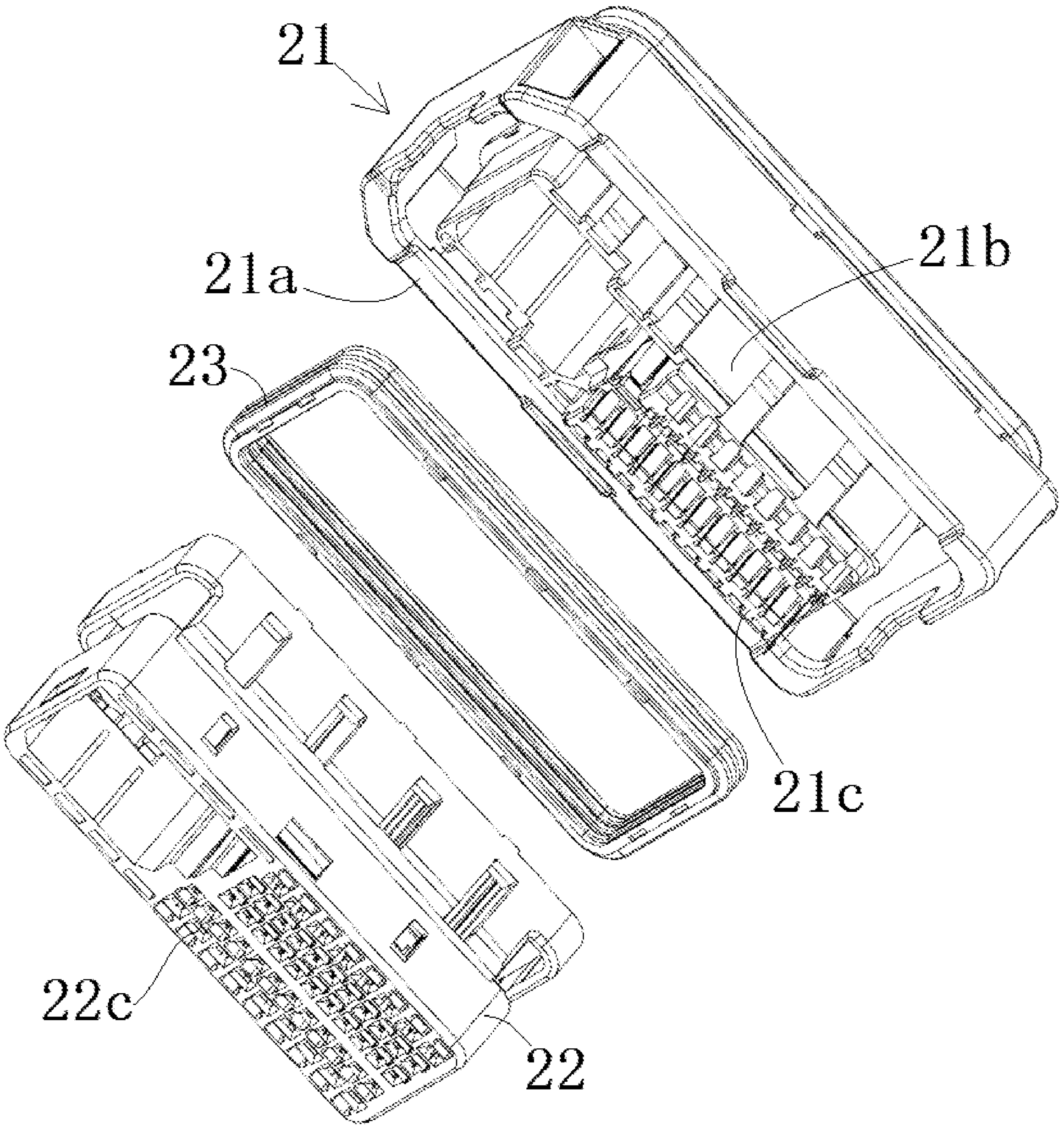
FIG. 6 shows the exploded schematic diagram of the mating connector shown in FIG. 5.
Figure 7:
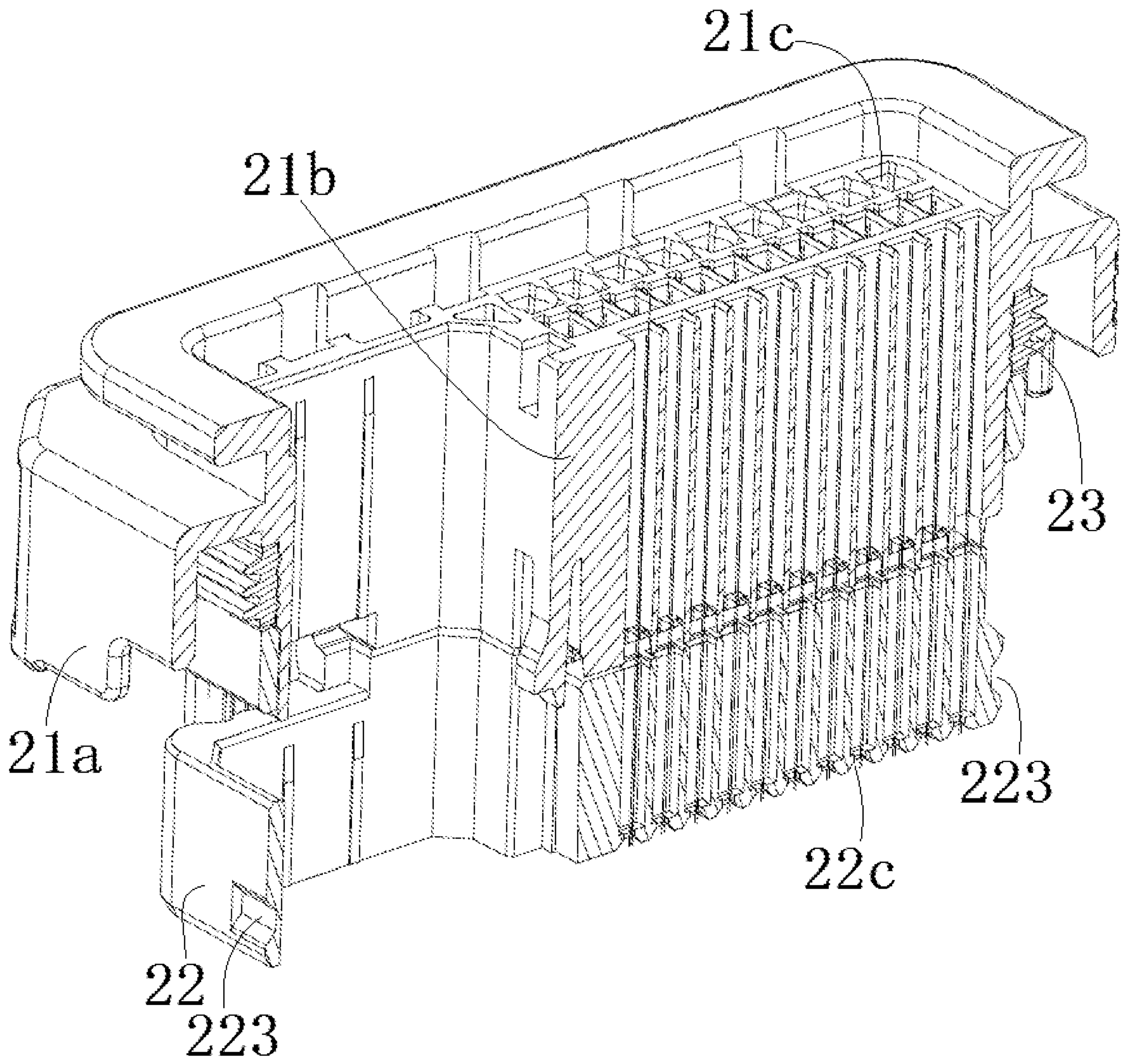
FIG. 7 shows a sectional view of the mating connector shown in FIG. 5.

FIG. 6 shows the exploded schematic diagram of the mating connector shown in FIG. 5; FIG. 7 shows a sectional view of the mating connector shown in FIG. 5.

As shown in FIG. 5 to FIG. 7, in the illustrated embodiment, the mating connector mainly includes: a mating housing 21 and a seat 22. The seat 22 is integrally formed with or installed in the mating housing 21. As shown in FIGS. 9-10 and 12, in the illustrated embodiment, the seat 22 of the mating housing 21 is adapted to be inserted into the housing 11 of the aforementioned connector. A hole 21*c* allowing the terminal to pass through is formed on the mating housing 21, a hole 22*c* corresponding to the hole 21*c* of the mating housing 21 is formed in the seat 22, and the terminal is accommodated in the hole 21*c* of the mating housing 21 and the hole 22*c* of the seat 22.

As shown in FIGS. 5-7 and FIG. 12, in the illustrated embodiment, an engagement recess 223 suitable for engagement with the engagement protrusion 123 on the terminal protector 12 is formed on the seat 22. The engagement protrusion 123 and the engagement recess 223 are configured to be able to separate from each other under the action of a predetermined pulling force, so that the terminal protector 12 can be separated from the seat 22 of the mating connector under the blocking of the blocking step 11*e* when the mating connector is pulled out.

As shown in FIGS. 5-7 and FIG. 12, in the illustrated embodiment, the mating housing 21 includes an outer housing 21*a* and an inner housing 21*b*. The inner housing 21*b* is provided in the outer housing 21*a*. The mating connector also includes a second elastic sealing ring 23, which is sleeved on the inner housing 21*b*. One end of the housing 21*a* is connected to the inner housing 21*b*, and the side wall 11*a* at the port of the housing 11 of the connector is adapted to be inserted into a gap between the housing 21*a* and the inner housing 21*b*. The second elastic sealing ring 23 is adapted to be compressed between the side wall 11*a* of the connector housing 11 and the inner housing 21*b* of the mating connector to seal the mating interface between the side wall 11*a* of the connector housing 11 and the inner housing 21*b* of the mating connector.

In an exemplary embodiment of the present invention, the connector may be a male connector with a male terminal, and the mating connector may be a female connector with a female terminal. When the connector and the mating connector are mated together, the male terminal and the female terminal are mated together.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A terminal protector, comprising:

a side wall; and a base plate connected to the bottom of the side wall and formed with a hole allowing the terminal to pass through;

wherein a first elastic cantilever is formed on the side wall of the terminal protector, the first elastic cantilever is a part of the side wall, and the inner and outer surfaces of the first elastic cantilever are respectively flush with the inner and outer surfaces of the side wall, so that the first elastic cantilever does not occupy the space outside the side wall;

wherein a first blocking protrusion is formed on the outside of the first elastic cantilever, and the first blocking protrusion is adapted to cooperate with a blocking step on a connector to block the terminal protector at a predetermined position.

2. The terminal protector according to claim 1, wherein an engagement protrusion is formed on the inner side of the first elastic cantilever, and the engagement protrusion is adapted to engage with an engagement recess on a mating connector to engage the terminal protector to the mating connector.

3. The terminal protector according to claim 1, wherein an avoidance slot is formed on the terminal protector, and the avoidance slot is used to avoid a release protrusion on the connector, so as to allow the release protrusion to enter into or exit from the terminal protector through the avoidance slot.

4. The terminal protector according to claim 1, wherein the terminal protector is in a box shape without a cover, and the first elastic cantilever is formed on each side wall of the terminal protector.

5. A connector, comprising:

a terminal protector having a terminal protector side wall and a base plate connected to the bottom of the side wall;

a housing having an accommodation cavity surrounded by a housing side wall and a port suitable for inserting a mating connector, wherein a first elastic cantilever is formed on the terminal protector side wall, the first elastic cantilever is a part of the terminal protector side wall, and the inner and outer surfaces of the first elastic cantilever are respectively flush with the inner and outer surfaces of the terminal protector side wall, so that the first elastic cantilever does not occupy the space outside the terminal protector side wall;

wherein a second elastic cantilever is formed on the housing side wall, the second elastic cantilever is a part of the housing side wall, and the inner and outer surfaces of the second elastic cantilever are respectively flush with the inner and outer surfaces of the housing side wall, so that the second elastic cantilever does not occupy a space outside the side wall of the housing;

wherein a first blocking protrusion is formed on the outside of the first elastic cantilever, and the first blocking protrusion is adapted to cooperate with a blocking step on the housing to block the terminal protector at a predetermined position.

6. The connector according to claim 5, wherein the housing is adapted to be installed in a mounting hole of a panel, and an elastic snap suitable for locking the panel is formed on the outside of the side wall of the housing.

7. The connector according to claim 6, wherein a lip plate is formed on the outside of the side wall of the housing, and the connector also includes a first elastic sealing ring installed on the lip plate;

wherein when the housing is installed into the mounting hole of the panel, the first elastic sealing ring is compressed between the panel and the lip plate to seal a mating interface between the housing and the panel.

8. The connector according to claim 5, wherein the terminal protector is installed in the accommodation cavity of the housing, the base plate connected to the bottom of the side wall and formed with a hole allowing the terminal to pass through.

9. The connector according to claim 8, wherein the terminal protector is configured to be moved between an initial position and a final position relative to the housing along an extension direction of a terminal passing through the terminal protector;

wherein before mating with a mating connector, the terminal protector is pre held at the initial position close to the port of the housing;

wherein after mating with the mating connector, the terminal protector is pushed by the mating connector to the final position away from the port of the housing.

10. The connector according to claim 9, wherein when the terminal protector is pushed to the final position by the mating connector, the engagement protrusion on the terminal protector is engaged with the engagement recess on the mating connector, so as to allow the terminal protector to be pulled from the final position to the initial position by the mating connector.

11. The connector according to claim 9, wherein a blocking step is formed on the inner side of the side wall of the housing, the blocking step is adapted to cooperate with the first blocking protrusion on the terminal protector to prevent the terminal protector from being moved towards the port of the housing;

wherein a second blocking protrusion is formed on the inner side of the second elastic cantilever, and the second blocking protrusion is adapted to abut against the bottom surface of the terminal protector to prevent the terminal protector from being moved towards the bottom of the housing opposite to the port.

12. The connector according to claim 10, wherein when the terminal protector is in the initial position, the first blocking protrusion abuts against the blocking step, and the second blocking protrusion abuts against the bottom surface of the terminal protector, so that the terminal protector is held at the initial position.

13. The connector according to claim 11, wherein a release protrusion is formed on the inner side of the second elastic cantilever, and the release protrusion is adapted to drive the second blocking protrusion on the second elastic cantilever to separate from the terminal protector under the push of the inserted mating connector, so as to allow the terminal protector to be moved from the initial position to the final position.

14. The connector according to claim 13, wherein the release protrusion protrudes inward with a height exceeding the second blocking protrusion and has an arc-shaped guide surface or an inclined guide surface suitable for sliding contact with the mating connector;

wherein an avoidance slot for avoiding the release protrusion is formed on the terminal protector to allow the release protrusion to enter into or exit from the interior of the terminal protector through the avoidance slot.

15. A connector assembly, comprising:

a connector comprising:

a terminal protector having a terminal protector side wall and a base plate connected to the bottom of the side wall:

a housing having an accommodation cavity surrounded by a housing side wall and a port suitable for inserting a mating connector, wherein a first elastic cantilever is formed on the terminal protector side wall, the first elastic cantilever is a part of the terminal protector side wall, and the inner and outer surfaces of the first elastic cantilever are respectively flush with the inner and outer surfaces of the terminal protector side wall, so that the first elastic cantilever does not occupy the space outside the terminal protector side wall;

wherein a second elastic cantilever is formed on the housing side wall of, the second elastic cantilever is a part of the housing side wall, and the inner and outer surfaces of the second elastic cantilever are respectively flush with the inner and outer surfaces of the housing side wall, so that the second elastic cantilever does not occupy a space outside the side wall of the housing:

wherein a first blocking protrusion is formed on the outside of the first elastic cantilever, and the first blocking protrusion is adapted to cooperate with a blocking step on the housing to block the terminal protector at a predetermined position; and a mating connector adapted to mate with the connector.

16. The connector assembly of claim 15, wherein the mating connector comprises:

a mating housing; and a seat integrally formed with the mating housing or installed in the mating housing, wherein the seat is adapted to be inserted into the housing of the connector, and an engagement recess adapted to engage with the engagement protrusion of the terminal protector is formed on the seat, wherein the engagement protrusion and the engagement recess are configured to be able to separate from each other under the action of a predetermined pulling force, so that when the mating connector is pulled out, the terminal protector is able to be separated from the mating connector under the blocking of the blocking step.

17. The connector assembly according to claim 16, wherein the mating housing comprises:

an outer housing; and an inner housing arranged in the outer housing, wherein the mating connector also comprises a second elastic sealing ring, which is sleeved on the inner housing, wherein one end of the outer housing is connected to the inner housing, and the side wall at the port of the housing of the connector is inserted into a gap between the outer housing and the inner housing, wherein the second elastic sealing ring is compressed between the side wall of the housing of the connector and the inner housing of the mating connector to seal a mating interface between the side wall of the housing of the connector and the inner housing of the mating connector.

* * * * *